United States Patent
Arai et al.

(10) Patent No.: US 7,918,463 B2
(45) Date of Patent: Apr. 5, 2011

(54) RECIPROCATING SEAL

(75) Inventors: Hidenori Arai, Fukushima (JP); Kazuki Takeno, Fukushima (JP); Ichiro Yamane, Fukushima (JP); Shinobu Munekata, Fukushima (JP); Katsumi Yamashina, Fukushima (JP); Masaru Watanabe, Fukushima (JP)

(73) Assignee: Nok Corporation, Tokyo (JP)

( * ) Notice: Subject to any disclaimer, the term of this patent is extended or adjusted under 35 U.S.C. 154(b) by 30 days.

(21) Appl. No.: 12/230,708

(22) Filed: Sep. 3, 2008

(65) Prior Publication Data

US 2009/0134586 A1 May 28, 2009

Related U.S. Application Data

(63) Continuation of application No. 10/531,443, filed as application No. PCT/JP03/11995 on Sep. 19, 2003, now abandoned.

(30) Foreign Application Priority Data

Oct. 15, 2002 (JP) .................................. 2002-300650

(51) Int. Cl.
*F16J 15/32* (2006.01)
(52) U.S. Cl. ....................................................... 277/559
(58) Field of Classification Search .................. None
See application file for complete search history.

(56) References Cited

U.S. PATENT DOCUMENTS

| | | | | |
|---|---|---|---|---|
| 5,143,385 A | * | 9/1992 | Sponagel et al. | 277/559 |
| 5,649,709 A | * | 7/1997 | Munekata et al. | 277/560 |
| 6,029,980 A | * | 2/2000 | Downes | 277/552 |
| 6,279,914 B1 | * | 8/2001 | Yamanaka et al. | 277/569 |
| 6,726,211 B1 | * | 4/2004 | Kuroki et al. | 277/353 |
| 6,729,624 B1 | * | 5/2004 | Johnston | 277/560 |

FOREIGN PATENT DOCUMENTS

| | | | |
|---|---|---|---|
| GB | 1219272 | * | 5/1968 |
| GB | 1219272 | * | 1/1971 |
| GB | 2256687 A | | 12/1992 |
| JP | 63-168365 | | 11/1988 |
| JP | 64-27410 | | 2/1989 |
| JP | 02-035272 | | 2/1990 |
| JP | 2-121668 | | 10/1990 |
| JP | 02-136858 | | 11/1990 |
| JP | 03-39663 | | 4/1991 |
| JP | 05-6261 | | 1/1993 |
| JP | 6-84067 | | 12/1994 |
| JP | 2725292 B2 | | 12/1997 |
| JP | 2001-355740 | | 12/2001 |

OTHER PUBLICATIONS

Japanese Office Action dated Jun. 16, 2009.
European Search Report mailed from European Patent Office on Jun. 10, 2010 in corresponding European Patent Application No. 03808888.6-1252.

* cited by examiner

*Primary Examiner* — Shane Bomar
*Assistant Examiner* — Gilbert Y Lee
(74) *Attorney, Agent, or Firm* — Jacobson Holman PLLC

(57) ABSTRACT

A reciprocating seal used, for example, for a shock absorber. A main seal lip has a two-step lip structure including a first lip and a second lip and a plurality of protrusions extending in the direction of the shaft are formed on a sliding contact surface of the second lip, thereby improving frictional force characteristics and, at the same time, improving sealing performance.

9 Claims, 2 Drawing Sheets

RECIPROCATING SEAL

This application is a Continuation Application of U.S. patent application Ser. No. 10/531,443 filed Nov. 15, 2005, now abandoned which is a National Stage application of PCT/JP03/011995 filed Sep. 19, 2003.

FIELD OF THE INVENTION

The present invention relates to a reciprocating seal used, for example, for a shock absorber.

BACKGROUND OF THE INVENTION

A reciprocating seal of this kind has been conventionally known that is used for a shock absorber mounted in an automobile and the like.

Among reciprocating seals according to a conventional art like this is, for example, a seal shown in FIG. 3.

FIG. 3 is a schematic sectional view of a reciprocating seal according to a conventional art.

The reciprocating seal is arranged in an annular space between a shaft (not shown) and the inner periphery of a housing (in more detail, shaft hole made in the housing), which move relatively in the direction of the shaft, to form a sealed space.

A reciprocating seal 100 according to the conventional art, as shown in the drawing, is mainly provided with a metal ring 200 and a rubber seal 300 baked on the metal ring 200.

The rubber seal 300 has an outer peripheral seal portion 301 mounted on the inner periphery of the housing, a main seal lip 302 brought into sliding contact with the outer peripheral surface of the shaft, and a sub-seal lip 303 similarly brought into sliding contact with the outer peripheral surface of the shaft.

The reciprocating seal constructed in this manner is required to improve frictional force characteristics.

That is, it is required to reduce fine vibrations caused when the reciprocating seal is brought into sliding contact with the surface of the shaft to a minimum.

This is because, for example, when the reciprocating seal is used for the shock absorber of an automobile, as the frictional force characteristics are greater, vibrations are reduced to improve the riding comfort of the automobile.

Then, to improve frictional force characteristics, as shown in FIG. 3, the main seal lip 302 has a two-step lip structure including the first lip 302a of the first step and the second lip 302b of the second step.

In this manner, both of the first lip 302a and the second lip 302b are brought into sliding contact with the surface of the shaft to stabilize the position of the main seal lip 302.

With this, the frictional force can be made uniform to improve frictional force characteristics.

However, even if the second lip 302b of the second step is brought into sliding contact with the surface of the shaft to make the frictional force uniform, the sliding contact of the second lip 302b increases the frictional force.

Hence, this prevents the smooth sliding contact of the main seal lip 302, and the frictional force characteristics can not be improved sufficiently.

Therefore, a technology of roughening the surface of the second lip of the second step to reduce frictional force by the second lip 302b has been developed (for example, see Japanese Unexamined Patent Publication No. 2001-355740).

Structures of roughening the surface of the second lip in this manner include structures of matting the surface of the lip, forming spiral screw protrusions on the surface of the lip, and forming parallel protrusions vertical to the shaft on the surface of the lip (see the above patent publication).

However, in the case of the structure of matting the surface of the lip, the surface of the lip is formed in random asperity.

For this reason, the amount of leak of sealed-in fluid (which is usually oil, so descriptions will be provided below, assuming that the sealed-in fluid is oil) becomes nonuniform in whole and hence there is a possibility that the amount of leak might increase in part.

Further, there is a possibility that also the frictional force might be nonuniform in whole.

In other words, in the case of the structure of matting the surface of the lip, there is presented a problem that it is difficult to control the amount of leak and the distribution of frictional force with accuracy.

Further, in the case of the structure of forming spiral screw protrusions or the structure of forming parallel protrusions vertical to the shaft, when the surface of the lip is brought into sliding contact with the surface of the shaft, these protrusions scrape off the oil.

Therefore, there is presented a problem that the thickness of an oil film is made too thick to increase the amount of leak of the oil.

SUMMARY OF THE INVENTION

As described above, in the case of a conventional art, it is difficult to improve frictional force characteristics and, at the same time, to improve sealing performance.

The object of the invention is to provide a reciprocating seal capable of improving frictional force characteristics and at the same time improving sealing performance.

To achieve the above object, the invention adopts the following construction.

That is, according to the invention, there is provided a reciprocating seal that is provided in an annular space formed between a shaft and a housing, which move relatively to each other in the direction of the shaft, and has a seal lip brought into sliding contact with the surface of the shaft, wherein the seal lip has a two-step lip structure in which a plurality of protrusions extending in the direction of the shaft are formed on the surface of the lip of the second step.

According to the construction of the invention, the seal lip has the two-step lip structure and hence the position of the seal lip can be stabilized.

With this, the distribution of frictional force caused between the seal lip and the shaft can be made uniform.

Further, since the plurality of protrusions are formed on the surface of the lip of the second step, they can prevent an increase in the frictional force.

Still further, the plurality of these protrusions are so constructed as to extend in the direction of the shaft and hence the protrusions do not scrape off sealed-in fluid.

DETAILED DESCRIPTION OF THE PREFERRED EMBODIMENTS

Hereafter, the best mode of this invention will be described as an example in detail with reference to the drawings. However, as for the size, material, shape, and relative arrangement of constituent parts described in this embodiment, it is not intended to limit the scope of this invention only to these unless otherwise specified.

A reciprocating seal according to the invention will be described with reference to FIG. 1.

Figure 1:
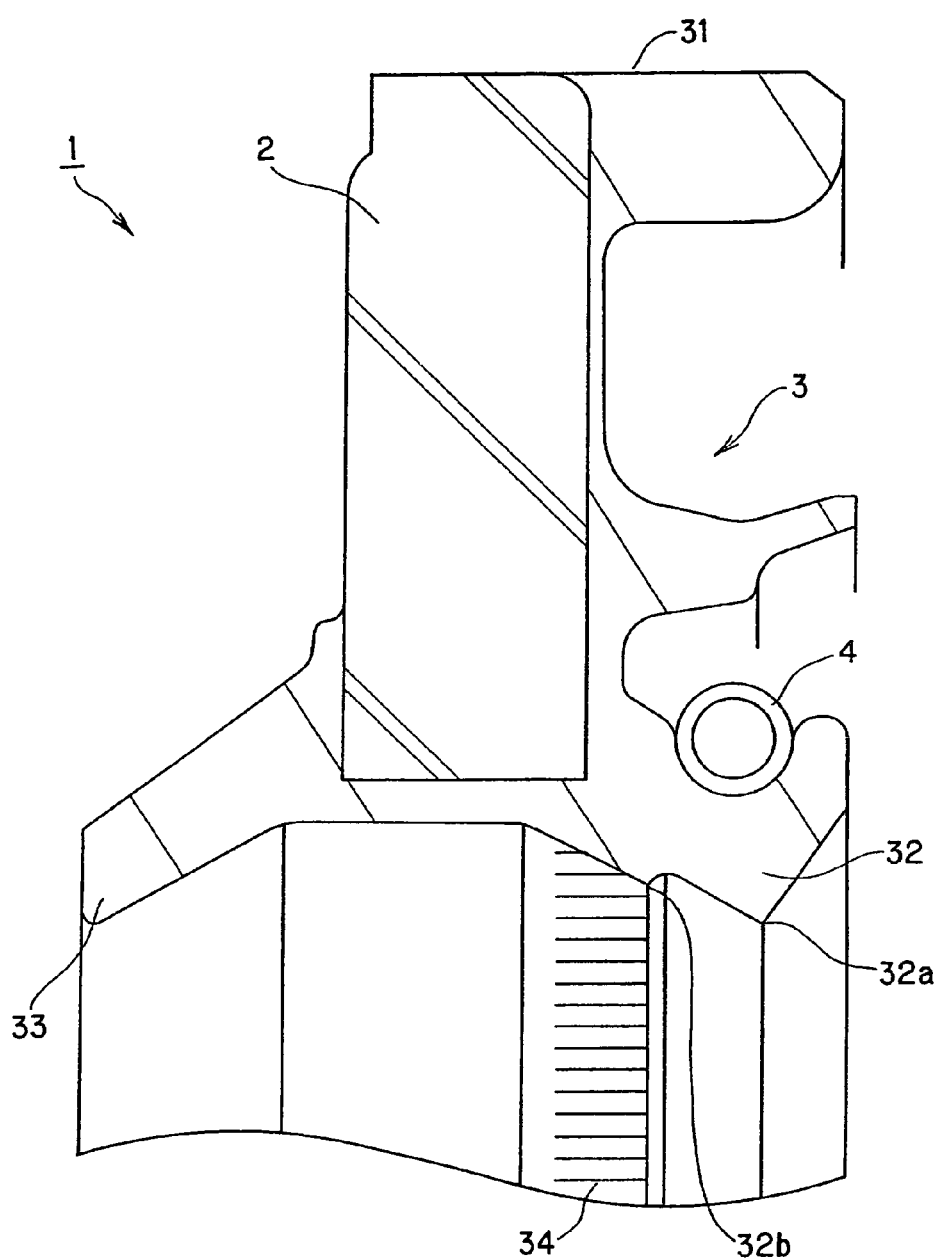
FIG. 1 is a schematic sectional view of a reciprocating seal according to an embodiment of the invention.

FIG. 1 is a schematic sectional view of a reciprocating seal according to the embodiment of the invention.

The reciprocating seal 1 according to the embodiment of the invention can be suitably used for a shock absorber mounted in an automobile and the like.

Further, the reciprocating seal 1 according to the embodiment of the invention is arranged in an annular space between a shaft (not shown) and the inner periphery of a housing (shaft hole made in the housing, in more detail), which move relatively to each other in the direction of the shaft, to form a sealed space.

In the case of using the reciprocating seal 1 as a shock absorber, oil of sealed-in fluid is hermetically sealed in a hermetically sealed space formed by the reciprocating seal 1.

With this, when a shaft and a housing reciprocate relatively to each other, the reciprocating seal 1 exerts a shock-absorbing function.

The reciprocating seal 1 according to this embodiment, as shown in FIG. 1, is roughly provided with a metal ring 2 and a rubber seal 3 baked on the metal ring 2.

The rubber seal 3 has an outer peripheral seal portion 31 mounted on the inner periphery of a housing not shown (the inner periphery of a shaft hole made in the housing), a main seal lip 32 brought into sliding contact with the outer peripheral surface of a shaft (not shown), and a sub-seal lip 33 similarly brought into sliding contact with the outer peripheral surface of the shaft.

Further, a spring 4 for pressing the lip onto the surface of the shaft is provided on the outer periphery side of the main seal lip 32.

Then, the main seal lip 32 has a two-step lip structure. That is, the main seal lip 32 has the first lip 32a of the first step located near the sealed-in fluid side and the second lip 32b of the second step located opposite to the sealed-in fluid side.

In this manner, the two-step lip structure is adopted and both of the first lip 32a and the second lip 32b are brought into sliding contact with the surface of the shaft to stabilize the position of the main seal lip 32.

With this, the distribution of frictional force can be made uniform to improve frictional force characteristics. That is, fine vibrations caused when the main seal lip 32 is brought into sliding contact with the surface of the shaft can be reduced.

In this embodiment, a plurality of protrusions 34 extending in the direction of the shaft are formed on the sliding contact surface (surface of the lip opposite to the sealed-in fluid side in this embodiment) of the second lip 32b.

These protrusions 34 are formed at equal intervals along the entire periphery.

The preferable example of these protrusions will be described.

Figure 2:
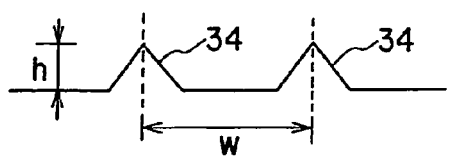
FIG. 2 is a sectional view showing conceptually protrusions formed on the reciprocating seal according to the embodiment of the invention.
Figure 3:
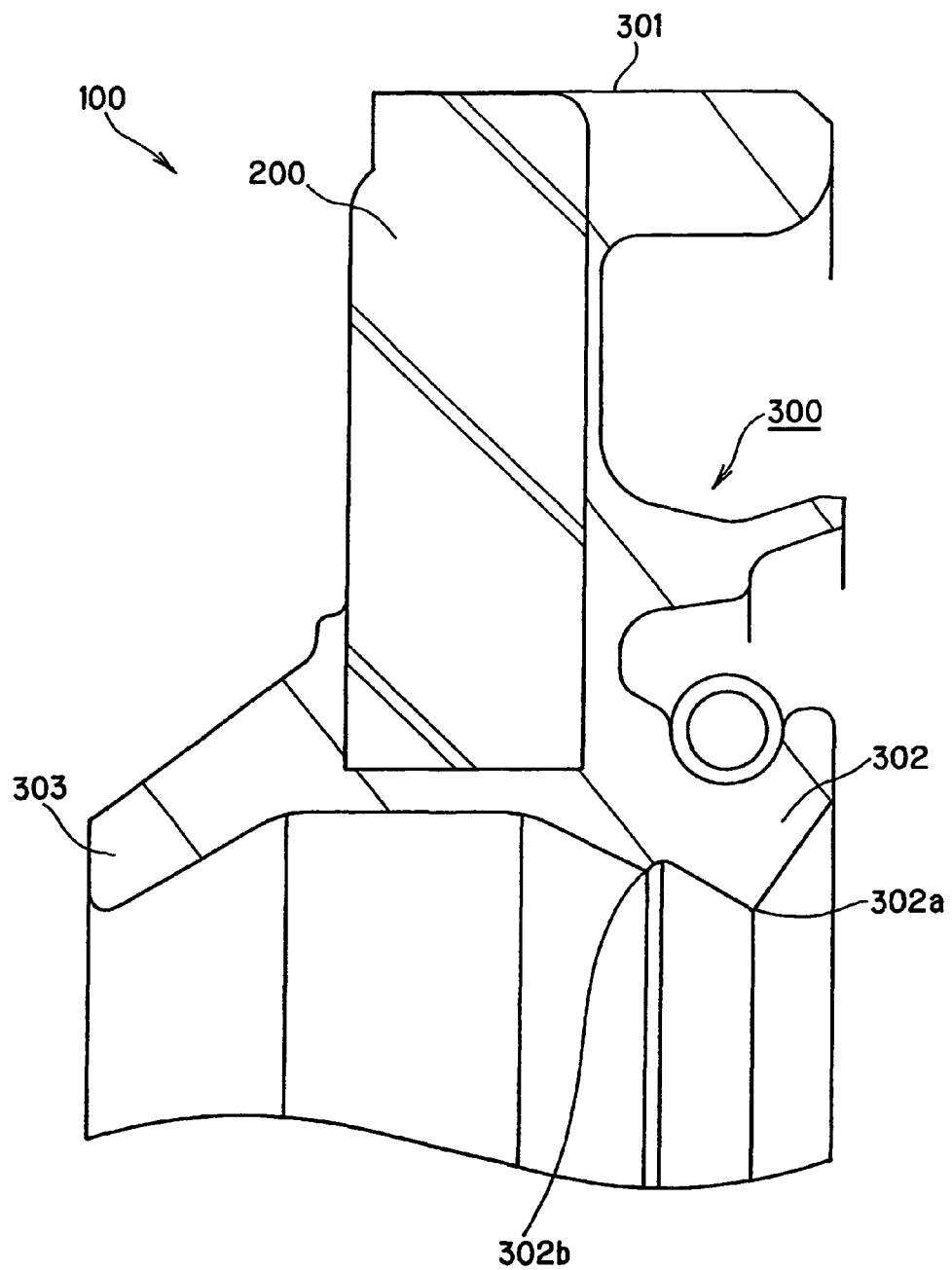
FIG. 3 is a schematic sectional view of a reciprocating seal according to a conventional art.

FIG. 2 is a sectional view showing conceptually protrusions formed on the reciprocating seal according to embodiment of the invention.

Preferably, the sectional shape of the protrusion is made triangular.

Preferably, the height h of the protrusion is made 2 to 500 μm and, when taking elastic contact into consideration, 5 to 100 μm.

Further, it is preferable that the interval w of the protrusions (interval of the peaks) is 0.005 to 1.0 mm and, when taking elastic contact into consideration, 0.01 to 0.2 mm.

Still further, it is preferable that the vertical angle of the protrusion is 60 to 120°.

A more specific example of the protrusion has a height H of 0.03 mm, an interval w of 0.15 mm, a vertical angle of 90°, and a length of 1.2 mm.

In this manner, in this embodiment, the plurality of protrusions 34 are formed on the sliding contact surface of the second lip 32b and hence can prevent an increase in frictional force.

This embodiment is so constructed as to prevent an increase in frictional force by the protrusions 34, so that it is possible to prevent the surface of the lip from being formed in random asperity as is the case of matting the surface of the lip.

That is, it is possible to control the shape and size of the protrusion 34 with precision.

Hence, it is possible to make the thickness of an oil film uniform and to prevent variations in the amount of leak (distribution of leak) of sealed-in fluid and variations in the distribution of frictional force.

Further, the plurality of protrusions 34 are so constructed as to extend in the direction of the shaft.

That is, the direction in which the protrusions 34 extend agrees with the direction in which the shaft and the housing move relatively to each other, and the direction in which the main seal lip 32 moves (slides to contact) with respect to the surface of the shaft.

Therefore, even when the main seal lip 32 reciprocates in sliding contact with the surface of the shaft, the protrusions 34 do not scrape off the sealed-in fluid (usually, oil).

This can prevent the film of the sealed-in fluid (usually, oil film) from being too thick.

Further, this can prevent the leak of the sealed-in fluid.

Incidentally, two kinds of velocity-ratio leak tests (Vten/Vcomp=4 (m/s)/1 (m/s), stroke of shaft=±25 mm, the number of vibrations=300, pressure=0 MPa and 0.5 MPa) were conducted on a reciprocating seal (conventional seal) having no protrusion and a reciprocating seal having the protrusions like this embodiment.

Then, there is little difference in the amount of leak between the two reciprocating seals.

Further, the above test was conducted also on a reciprocating seal having a plurality of spiral screw protrusions having an angle of 60° inclined with respect to the direction of the shaft.

Then, in the case of this reciprocating seal, the amount of leak increased by a factor of approximately 2 as compared with the reciprocating seal having no protrusion and the reciprocating seal according to this embodiment.

Here, the velocity-ratio leak test is a test of measuring the amount of leak when a shaft is pushed or pulled in such a way that a pushing speed is different from a pulling speed.

In other words, in the case of the reciprocating seal, when the shaft is pulled out, a thin oil film is formed on the surface of the shaft.

The thickness of this oil film tends to be thicker as the moving speed of the shaft is faster.

Hence, when the shaft is pulled out at a high speed and pushed at a low speed, the oil film becomes thicker in a pulling-out step (taking-out step) and becomes thinner in a pushing step.

For this reason, the oil tends to be easily scraped out.

It is the velocity-ratio leak test that measures the amount of leak of oil scraped out by pulling or pushing the shaft repetitively with a difference in speed between the pulling-out step and the pushing step.

In the above test, the pulling-out speed in the pulling-out step was four times the pushing speed in the pushing step.

As described above, according to the reciprocating seal according to this embodiment, it is possible to make the distribution of frictional force of the main seal lip 32 with respect to the surface of the shaft uniform and to prevent an increase in the frictional force.

With this, it is possible to improve frictional force characteristics, that is, to reduce fine vibrations caused when the main seal lip 32 is brought into sliding contact with the surface of the shaft.

Further, it is possible to prevent the leak of the sealed-in fluid and hence to improve sealing performance.

INDUSTRIAL APPLICABILITY

As described above, according to the construction of the invention, it is possible to improve frictional force characteristics and, at the same time, to improve sealing performance.

The invention claimed is:

1. A reciprocating seal provided in an annular space formed between a shaft and a housing, which move relatively to each other in a direction of the shaft, said reciprocating seal comprising
    a seal lip brought into sliding contact with a surface of the shaft,
    the seal lip having a two-step lip structure including a first step and a second step,
    a sub seal lip in sliding contact with the surface of the shaft,
    the second step being closer to the sub seal lip than said first step,
    the first step and the second step each having a first inclined surface and a second inclined surface relative to a longitudinal axis of the shaft, the first inclined surface of the first step and the second step being spaced further from the sub seal lip than the second inclined surface of the first step and the second step,
    the first inclined surface and the second inclined surface of the second step being separated by an apex of the second step, and
    a plurality of protrusions extending in a direction parallel to the longitudinal axis of the shaft and said plurality of protrusions extending in a direction perpendicular to the apex of the second step, said plurality of protrusions being formed on only the second inclined surface of the second step,
    said plurality of protrusions being equally spaced along an entire length of the protrusions.

2. The reciprocating seal of claim 1, wherein a cross-sectional shape of said plurality of protrusions is a triangle having two inclined intersecting surfaces.

3. The reciprocating seal of claim 2, wherein an angle formed by the two inclined intersecting surfaces of each of said plurality of protrusions is 60° to 120°.

4. The reciprocating seal of claim 2, wherein a height of the plurality of protrusions is 2 to 500 μm.

5. The reciprocating seal of claim 4, wherein the height is 5 to 100 μM.

6. The reciprocating seal of claim 1, wherein an interval between the apex of the second step and an apex of the first step is constant and in a range of 0.005 to 1.0 mm.

7. A reciprocating seal provided in an annular space formed between a shaft and a housing, which move relatively to each other in a direction of the shaft, said reciprocating seal comprising
    a seal lip brought into sliding contact with a surface of the shaft,
    the seal lip having a two-step lip structure including a first step and a second step,
    a sub seal lip in sliding contact with the surface of the shaft,
    the second step being closer to the sub seal lip than said first step,
    the first step and the second step each having a first inclined surface and a second inclined surface relative to a longitudinal axis of the shaft, the first inclined surface of the first step and the second step being spaced further from the sub seal lip than the second inclined surface of the first step and the second step,
    the first inclined surface and the second inclined surface of the second step being separated by an apex of the second step,
    a plurality of protrusions extending in a direction parallel to the longitudinal axis of the shaft and said plurality of protrusions extending in a direction perpendicular to the apex of the second step, said plurality of protrusions being formed on only the second inclined surface of the second step,
    a cross-sectional shape of said plurality of protrusions being a triangle having two inclined intersecting surfaces,
    an angle formed by the two inclined intersecting surfaces of each of said plurality of protrusions is 60° to 120°, and
    an interval between the protrusions being constant and being in a range of 0.005 to 1.0 mm.

8. The reciprocating seal of claim 7, wherein a height of the plurality of protrusions is in a range of 2 to 500 μm.

9. The reciprocating seal of claim 8, wherein the height is 5 to 100 μm.

\* \* \* \* \*

UNITED STATES PATENT AND TRADEMARK OFFICE
CERTIFICATE OF CORRECTION

PATENT NO. : 7,918,463 B2
APPLICATION NO. : 12/230708
DATED : April 5, 2011
INVENTOR(S) : Hidenori Arai et al.

It is certified that error appears in the above-identified patent and that said Letters Patent is hereby corrected as shown below:

On the Title page, Item (73) Assignee, please change "Nok" to --NOK--.

Signed and Sealed this
Nineteenth Day of July, 2011

David J. Kappos
*Director of the United States Patent and Trademark Office*